March 10, 1942.   L. CHUBB   2,275,732
GLASS REPLACEMENT TOOL
Original Filed Jan. 28, 1938
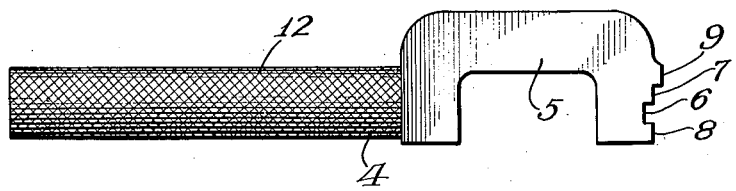
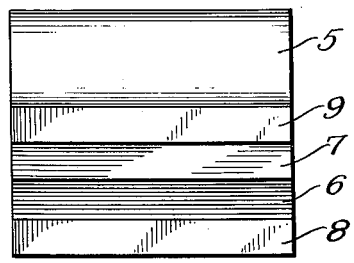
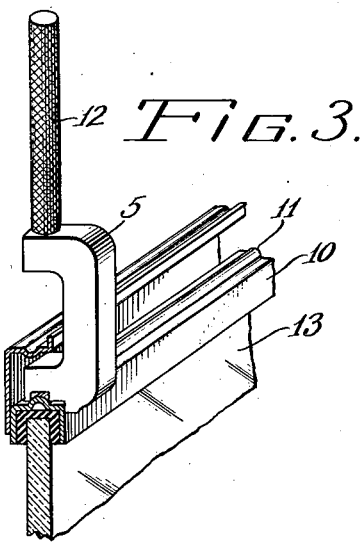
Inventor:
Loyde Chubb
By ........ Attorney Patented Mar. 10, 1942

2,275,732

UNITED STATES PATENT OFFICE 2,275,732

GLASS REPLACEMENT TOOL

Loyde Chubb, Lansing, Mich., assignor to Sommer & Maca Glass Machinery Corporation, Chicago, Ill., a corporation of Illinois Original application January 28, 1938, Serial No. 187,384. Divided and this application April 3, 1941, Serial No. 386,648

1 Claim. (Cl. 29—34)

This invention relates to devices for use in replacing the glass in the frames of automobile windows and particularly to the tool used for installing the channel of the frame on to the glass.

This application is a division of my application Serial No. 187,384, filed January 28, 1938, now Patent No. 2,241,028, dated May 6, 1941, for Glass replacement tool.

Conventional automobile glasses which are adapted to be opened or closed are provided with metal channels on at least one edge. When such glass breaks or becomes otherwise damaged and in need of replacement the channel is removed from the glass and a new piece of glass of the desired shape is installed in the channel. These channels are usually fitted quite securely to the glass and it is necessary to use considerable force in replacing them. Before the use of this invention the channels were often distorted to such an extent that they fit poorly or became wholly unfit for further use.

The principal object of this invention is to provide a suitable tool whereby the channels may be quickly and readily replaced on window glasses without damage to the glasses or to the channels.

Another object is to provide a tool on which the working edge thereof is suitably shaped to enable abutment thereof against an irregular shaped portion of the channel which will not distort or injure the channel when force is applied to the tool in forcing the channel on the glass.

Other and further objects of the present invention will be apparent from the following description and claim and are illustrated in the accompanying drawing which, by way of illustration, shows a preferred embodiment and the principle thereof and what I now consider to be the best mode in which I have contemplated applying that principle. Other embodiments of the invention embodying the same or equivalent principle may be used and structural changes may be made as desired by those skilled in the art without departing from the present invention and the scope of the appended claim.

In the drawing

Fig. 1 is a side elevation of the invention;

Fig. 2 is an end view of the working end of the tool; and

Fig. 3 is a perspective view of the tool showing it in use on a section of channel and window glass.

The invention embodies a tool generally referred to by the reference character 4 and consists of a U-shaped body portion 5. The outer end wall or working end of the tool is grooved at 6 and provided with shoulders 7 and 8 on opposite sides of the groove. A still further shoulder 9 is provided adjacent the shoulder 7 for the purpose of locating the tool on the channel 10 as best shown in Fig. 3. The step between the shoulders 7 and 9 is adapted to engage the side of the channel 10 to provide a guide for properly locating and positioning the tool on the channel. The groove 6 is adapted to receive the bead 11 of the channel and the shoulders 7 and 8 are adapted to engage the flat surfaces of the channel adjacent the bead 11. A handle 12 is suitably arranged on the end of the U-shaped body portion opposite the working end of the tool and is preferably knurled to make it easy to grasp.

The tool is adapted to be inserted in the channel as illustrated in Fig. 3 and the free end of the handle may be tapped with a hammer or other similar tool to drive the channel 10 on to the edge of the glass 13. Inasmuch as the body portion of the tool is U-shaped, a blow on the end of the handle 12 will be transmitted through the U-shaped tool to the working end thereof and thence on to the channel driving it on to the edge of the glass.

The blow is always applied directly over the center of the channel and on either side of the bead 11, and consequently no twisting, warping or other distortion of the channel will result. It is to be noted that the handle 12 is arranged in substantial alignment with the shoulders 7 and 8 so that the blow on the handle will be transmitted directly to the channel.

While I have illustrated and described a selected embodiment of my invention it is to be understood that this is capable of variation and modification and I therefore do not wish to be limited to the precise details set forth but desire to avail myself of such changes and alterations as fall within the scope of the following claim.

I claim:

A tool for replacing a channel on a window glass comprising a U-shaped body member, the outer face of one wall of said U-shaped body member having a transverse groove therein, a shoulder on each side of said groove adapted to engage said channel during replacement thereof on a window glass with the groove receiving the bead of the channel, a further shoulder raised from one of said first mentioned shoulders to provide a guide for positioning said tool on said channel, and a handle extending laterally from the outer face of the opposite wall of said U-shaped body member.

LOYDE CHUBB.